United States Patent
Thoemmes

(10) Patent No.: US 10,059,207 B2
(45) Date of Patent: Aug. 28, 2018

(54) CRASH DETECTION WHEN A MOTOR VEHICLE IS AT A STANDSTILL

(71) Applicant: AUDI AG, Ingolstadt (DE)

(72) Inventor: Marco Thoemmes, Ingolstadt (DE)

(73) Assignee: Audi AG, Ingolstadt (DE)

( * ) Notice: Subject to any disclaimer, the term of this patent is extended or adjusted under 35 U.S.C. 154(b) by 20 days.

(21) Appl. No.: 15/027,793

(22) PCT Filed: Aug. 8, 2014

(86) PCT No.: PCT/EP2014/002187
§ 371 (c)(1),
(2) Date: Apr. 7, 2016

(87) PCT Pub. No.: WO2015/051863
PCT Pub. Date: Apr. 16, 2015

(65) Prior Publication Data
US 2016/0257203 A1    Sep. 8, 2016

(30) Foreign Application Priority Data

Oct. 8, 2013 (DE) .......... 10 2013 016 702

(51) Int. Cl.
*B60K 28/14* (2006.01)
*B60L 11/18* (2006.01)
(Continued)

(52) U.S. Cl.
CPC .............. *B60L 3/04* (2013.01); *B60K 28/14* (2013.01); *B60L 3/0007* (2013.01);
(Continued)

(58) Field of Classification Search
CPC .. B60L 3/0015; B60L 3/04; B60L 9/16; B60L 11/1809; B60L 11/1816;
(Continued)

(56) References Cited

U.S. PATENT DOCUMENTS

2004/0254729 A1* 12/2004 Browne ................ B60R 21/013
701/301
2006/0137929 A1    6/2006 Yoshida
(Continued)

FOREIGN PATENT DOCUMENTS

CN    102782985    11/2012
CN    202685970    1/2013
(Continued)

OTHER PUBLICATIONS

Chinese Search Report dated Feb. 4, 2017 with respect to counterpart Chinese patent application 201480055665.0.
(Continued)

*Primary Examiner* — Stephen Holwerda
(74) *Attorney, Agent, or Firm* — Henry M. Feiereisen, LLC

(57) ABSTRACT

In a method for detecting whether a motor vehicle in a parked state, in particular in the switched-off state, has been hit or moved, at least one sensor signal is transmitted as a function of a position of the motor vehicle relative to at least one vehicle-external reference object from a sensor device to a control device. The control device compares the at least one sensor signal with at least one predetermined signal pattern or with at least one predetermined value interval or with at least one predetermined signal template, and transmits at least one control command for initiating a safety measure to at least one unit of the motor vehicle, when the comparison reveals a difference.

15 Claims, 1 Drawing Sheet

(51) Int. Cl.
B60L 3/04 (2006.01)
B60L 3/00 (2006.01)

(52) U.S. Cl.
CPC ......... B60L 11/182 (2013.01); B60L 11/1829 (2013.01); B60L 11/1835 (2013.01); B60L 2240/622 (2013.01); Y02T 10/7005 (2013.01); Y02T 10/7072 (2013.01); Y02T 10/7291 (2013.01); Y02T 90/12 (2013.01); Y02T 90/121 (2013.01); Y02T 90/122 (2013.01); Y02T 90/125 (2013.01); Y02T 90/14 (2013.01); Y02T 90/16 (2013.01); Y02T 90/162 (2013.01)

(58) Field of Classification Search
CPC ........ B60L 3/0038; B60L 3/12; B60L 11/182; B60L 11/1829; B60L 11/1835; B60L 3/0007; B60L 2240/622; B60R 21/0132; B60R 21/0134; B60R 21/01512; B60R 21/01554; B60R 21/164; G08B 21/02; B60K 28/14; Y02T 90/122; Y02T 10/7005; Y02T 90/16; Y02T 90/125; Y02T 90/162; Y02T 90/12; Y02T 10/7072; Y02T 10/7291; Y02T 90/121; Y02T 90/14
See application file for complete search history.

(56) References Cited

U.S. PATENT DOCUMENTS

| | | | |
|---|---|---|---|
| 2007/0237027 A1* | 10/2007 | Sugiura | B60R 21/013 367/96 |
| 2009/0212993 A1 | 8/2009 | Tsunekawa | |
| 2011/0074346 A1* | 3/2011 | Hall | B60L 3/00 320/108 |
| 2011/0175569 A1* | 7/2011 | Austin | B60L 11/1824 320/109 |
| 2011/0187320 A1* | 8/2011 | Murayanna | H02J 7/00 320/108 |
| 2011/0196545 A1* | 8/2011 | Miwa | B60K 6/365 700/292 |
| 2011/0202476 A1 | 8/2011 | Nagy | |
| 2012/0025761 A1* | 2/2012 | Takada | H02J 5/005 320/108 |
| 2012/0133204 A1* | 5/2012 | Ang | B60L 3/0007 307/10.1 |
| 2013/0030615 A1 | 1/2013 | Ichikawa | |
| 2013/0037365 A1 | 2/2013 | Ichikawa | |
| 2013/0307471 A1* | 11/2013 | Ichikawa | H02J 7/007 320/108 |

FOREIGN PATENT DOCUMENTS

| | | |
|---|---|---|
| DE | 102009039913 A1 | 6/2010 |
| DE | 102010043056 A1 | 5/2012 |
| DE | 102011085976 A1 | 5/2013 |
| EP | 2362362 A1 | 8/2011 |
| GB | 2436692 A | 3/2007 |

OTHER PUBLICATIONS

Translation of Chinese Search Report dated Feb. 4, 2017 with respect to counterpart Chinese patent application 201480055665.0.

* cited by examiner

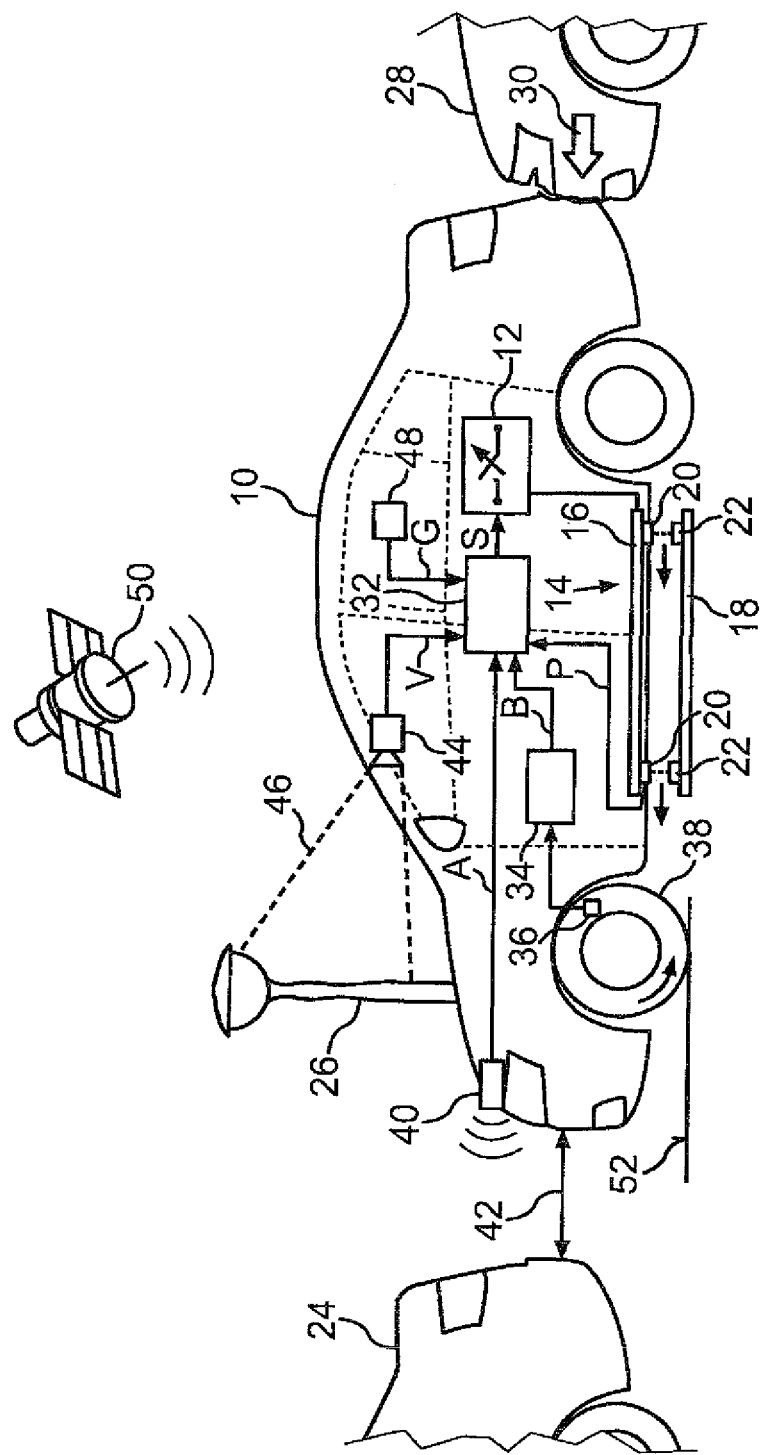

CRASH DETECTION WHEN A MOTOR VEHICLE IS AT A STANDSTILL

CROSS-REFERENCES TO RELATED APPLICATIONS

This application is the U.S. National Stage of International Application No. PCT/EP2014/002187, filed Aug. 8, 2014, which designated the United States and has been published as International Publication No. WO 2015/051863 and which claims the priority of German Patent Application, Serial No. 10 2013 016 702.7, filed Oct. 8, 2013, pursuant to 35 U.S.C. 119(a)-(d).

BACKGROUND OF THE INVENTION

The invention relates to a method to detect whether a parked motor vehicle has been hit, i.e. whether a collision has occurred, and/or whether the motor vehicle has been moved by external influence. In particular, the method is provided for detection of a collision, when the motor vehicle is shut down, i.e. when the motor vehicle is in an ignition-off condition, i.e. the ignition system is switched off, which can be detected, for example, at terminal 15 off-state according to DIN (German Industrial Standard) 72552.

DE 10 2009 039 913 A1 is known in the art for this purpose to switch off a high-voltage system in a motor vehicle, when the motor vehicle is hit as a traction battery of the high-voltage system is charged. The sensor is hereby based on an acceleration detection. The use of the existing crash sensor for deploying an airbag is not possible with this system since its acceleration sensor is not sensitive enough to detect a collision for switching off a high-voltage system. The motor vehicle is, therefore, provided with a sensor and a control unit, which are used exclusively for switching off the high-voltage system. A disadvantage of this system is the need for providing a dedicated circuitry, causing added production costs for the motor vehicle.

EP 2362362 A1 discloses a method for charging electric vehicles in geographically dispersed charging stations. The charging operation of a motor vehicle is hereby monitored in the charging station, and an image of the motor vehicle is recorded in the charging station, when the charging process is interrupted, interfered with, or deviates from a given course. This increases security against abuse and manipulation. An interference during the charging process is detected on the basis of a predetermined charging characteristic.

A disadvantage of this system is that a collision of the motor vehicle with an object hitting it does not necessarily interfere with the charging process in of itself, but causes damage, for example, only to a DC link of the high-voltage system. In other words, a collision cannot be detected with the system.

A collision detection when a motor vehicle is at a standstill affords, in addition to the emergency shutdown of a high-voltage system, also other advantages. For example, an airbag can be reliably deployed.

SUMMARY OF THE INVENTION

The invention is based on the objective to reliably detect, whether a parked motor vehicle has been hit and/or has been moved.

The objective is achieved by the subject matters of the independent patent claims. Advantageous refinements of the invention are set forth by the features of the dependent patent claims.

The method according to the invention is based on the recognition that a motor vehicle has available sensors, which enable determination of the relative position of a motor vehicle in relation to vehicle-external reference objects. When a change in the position relative to these reference objects is recognized, it is evident that a parked vehicle must apparently have been hit by another object and/or had been moved through external influence.

The method according to the invention thus provides that a control device of the motor vehicle, for example a control unit or a central processing device, receives from a sensor device of the motor vehicle at least one sensor signal which is dependent on a relative position of the motor vehicle to at least one vehicle-external reference object. A reference object is, preferably, a stationary object, in particular a ground-fixed object. For example, using a camera a third-party vehicle parked in front of the motor vehicle can thus be filmed. In the method according to the invention, the at least one sensor signal is examined as to whether it indicates a collision and/or movement. For this purpose, the at least one sensor signal is compared in accordance with one embodiment with at least one predetermined signal pattern. A signal pattern describes a signal form, as it can be established, when the motor vehicle is hit or moved in a predefined manner. In addition or as an alternative to a signal pattern, at least a predetermined threshold value may also be used. Depending on the sensor signal, the presence of a collision may already be inferred, when exceeding or falling below a certain threshold value. The threshold value thus defines a value interval, within which or outside of which the sensor signal must lie. A bilaterally limited value interval may also be used as basis. Another option involves a comparison of at least one sensor signal with at least one predetermined signal template. Unlike the signal pattern, a signal template does not describe a precise course but defines an interval or a corridor or a tube, within which or outside of which the sensor signal has to be located so that no collision is recognized.

According to the method of the invention, at least one control command to initiate a safeguard measure is transmitted to at least one unit of the motor vehicle, when the comparison reveals the presence of a difference. Preferably, the at least one control command causes as the at least one unit of the motor vehicle a high-voltage system and/or a charging system for a traction battery of the motor vehicle to be switched off. The charger may involve an inductive charger based on alternating voltage or also a DC charger (direct current). A high-volt voltage involves in particular an electric voltage which is greater than 60 V.

The invention has the advantage that in the presence of a parked the motor vehicle, in particular a motor vehicle that has been shutdown, a collision and/or movement may also be detected, even when the crash sensor for deploying an airbag is not operated.

It is particularly advantageous, when each sensor signal is generated by a sensor device, which transmits its sensor signal also to at least one other component of the motor vehicle, which component provides, on the basis of the sensor signal, a function in the motor vehicle that is different from the collision detection. In other words, use of a sensor device is contemplated, which already exists for other functions in the motor vehicle. It is hereby not necessary to provide the motor vehicle with a dedicated circuitry for executing the method according to the invention. This may involve a sensor device, which is operated, even when the motor vehicle is shut down or provision may also be made to permanently or intermittently add a sensor device which is not operated for providing the other functions, while the motor vehicle is at a standstill or shut down. For example, detection of the collision and/or movement may thus also be realized by activation of a navigation device to read out a speed sensor of the wheels of the motor vehicle and to thereby detect a rolling of the motor vehicle, as it is used, for example, when driving through tunnels, when no GPS signal (GPS—Global Positioning System) is available.

Preferably, provision is made for using as sensor signal a positioning signal of a positioning sensor of an inductive charging system. Such a positioning signal is available, even while the motor vehicle is shut down, when the motor vehicle is positioned above an inductive charger and charged with an alternating magnetic field of a floor-side primary coil. The positioning sensor is provided in the art to properly position the motor vehicle above the primary coil prior to the charging process, so that the secondary coil of the charging system in the motor vehicle is arranged in closest possible proximity above the primary coil. This positioning sensor also enables to monitor the presence of any change in a position or location of the motor vehicle, even after the charging process has commenced.

In connection with an inductive charging system, a further advantageous refinement involves the use of an impedance value signal of an impedance measuring device of the inductive charging system also for movement detection. The impedance value changes, when the position of the secondary coil relative to the primary coil changes. This, too, allows inference that the motor vehicle has been hit or has rolled away.

As mentioned above, also a navigation system or another positioning system of the motor vehicle can be used to receive a GNSS signal (GNSS—Global Navigation Satellite System) as a sensor signal.

A further advantageous embodiment is realized, when a distance signal of an ultrasonic sensor and/or a radar sensor and/or an image signal of a camera is received as a sensor signal. These signals enable recognition of a movement of the motor vehicle by few centimeters.

According to one embodiment of the method, false activations are effectively prevented by generating the at least one control command to initiate the safety measure only when at least one predefined plausibility condition is satisfied. Such plausibility condition requires the activation of a charging mode for charging a traction battery of the motor vehicle, in which charging mode electrical energy is transmitted via a charging system to the traction battery. Another plausibility condition involves a wired charging process. The safety measure is then initiated only when a collision and/or movement is detected while a charging plug is inserted. Another plausibility condition requires engagement of a parking brake of the motor vehicle. This is also an indication that the driver does not intend to move the motor vehicle. When a traction battery is charged, the parking brake must be engaged and/or the drive must be blocked by other means. In this case, the movement monitoring should then, preferably, also be enabled. When a high-voltage component is active, while ignition is turned off, e.g. an auxiliary air conditioner, this, too, is an indication of a parking process. The airbag control unit is hereby disabled since the ignition is switched off, so that also in this case the presence of a special protection is also advantageous in the event of a collision. Which plausibility condition or combination of plausibility conditions are best suited for a particular motor vehicle to detect a movement can be determined by the expert on the basis of tests.

As described above, the sensor signals are examined on the basis of a signal pattern, a value interval and/or a signal template. Signal patterns, value intervals, and signal templates are preferably configured such as to describe a predetermined momentum and/or a predetermined acceleration and/or a predetermined displacement path and/or a predetermined timing sequence of the respective sensor signal. This may involve a description of a normal state in which there is thus no collision, or a state with collision. Particular care should be taken to differentiate between a collision and a shaking of the vehicle, as can be caused, when a person rocks the motor vehicle. Appropriate signal patterns/value intervals/signal templates can be determined, for example, in tests and crash tests.

According to a further embodiment of the method, provision is made for a comparison, after starting the motor vehicle, of a current position value of the motor vehicle with a position value stored before or during a preceding shutdown. Thus, it is examined whether the motor vehicle has changed its position during a parking phase. When detecting a difference between the two position value, the at least one control command to initiate the safety measure is then generated and/or the driver is alerted, e.g. by activating a warning lamp. This can at least prevent the driver from driving away in the presence of a possibly damaged high-voltage system, or otherwise damaged motor vehicle.

The invention also provides a motor vehicle, which is configured to execute an embodiment of the method according to the invention. For this purpose, the motor vehicle includes a respective control unit and a sensor device which is configured to generate, at a standstill of the motor vehicle, a sensor signal which is dependent on a relative position of the motor vehicle with respect to at least one vehicle-external reference object.

According to an advantageous refinement of the motor vehicle according to the invention, an inductive charging device is provided for a traction battery of the motor vehicle and includes a secondary coil for inductive charging. A positioning device for positioning the secondary coil in relation to a vehicle-external primary coil is configured to transmit its positioning signal also to the control device, so that, based on this positioning signal, a collision can also be detected upon the motor vehicle.

BRIEF DESCRIPTION OF THE DRAWING

In the following, an exemplary embodiment of the invention is described. For this purpose, the only FIGURE (FIG.) shows a schematic illustration of an embodiment of the vehicle according to the invention.

DETAILED DESCRIPTION OF PREFERRED EMBODIMENTS

The exemplary embodiment described hereinafter involves a preferred embodiment of the invention. In the exemplary embodiment, the described components of the embodiment represent individual features of the invention which are to be considered independently from one another, and which further refine the invention independently of each other and thus are to be regarded as part of the invention alone or in a combination that differs from the shown combination. Furthermore, the described embodiment can be supplemented by other features of the invention than those previously described.

The FIGURE shows a motor vehicle 10, which may involve, for example, a motor car, especially a passenger car.

The motor vehicle 10 includes a high-voltage system 12, having a high-voltage battery (not shown in greater detail) which is being charged by a charging system 14. The charging system 14 can include a secondary coil 16, which receives a magnetic alternating field from a stationary primary coil 18. For this purpose, the motor vehicle 10 has been parked by a driver (not shown in greater detail) above the primary coil 18. For positioning the secondary coil 16 above the primary coil 18, the driver utilizes a positioning system 20, which uses fixed markings 22 of the primary coil 18 as reference points.

A third-party vehicle 24 is parked in the example shown in front of the motor vehicle 10. Standing next to the motor vehicle 10 is another non-vehicle object 26, e.g. a street lamp.

During the charging process, the motor vehicle 10 is hit by another vehicle 28, which transmits as a result a momentum 30 onto the motor vehicle 10 of a magnitude sufficient that the high-voltage system 12 should be switched off for safety reasons. The motor vehicle 10 automatically detects the collision, as a result of which the momentum 30 is transmitted to the motor vehicle 10.

For this purpose, the motor vehicle 10 is provided with a monitoring device 32, which may involve, for example, a control unit or a central processing device of the motor vehicle. For collision detection, the monitoring device 32 may use a positioning signal P of the positioning device 20 for the collision detection. Furthermore, the monitoring device 32 can receive, for example, a movement signal B from a navigation assist system 34, with the movement signal B generated, for example, by a rotation sensor 36 which detects a rotation of a wheel 38 of the motor vehicle 10, as the momentum 30 is transmitted. The monitoring device 32 may also receive a distance signal A from a distance sensor 40, for example an ultrasonic sensor or radar sensor, which measures a distance 42 to the third party vehicle 24. The monitoring device 32 may also receive a camera signal or video signal V from a camera 44, whose detection range 46 can, for example, be directed to the object 26. The monitoring device 32 may also receive a GPS signal G from a locating device 48, for example a GPS receiver, which receives a signal from one or more GPS satellites 50.

Based on the received signals, the monitoring device 32 is able to determine that the motor vehicle 10 has been hit to such an extent that the high-voltage system 12 must be switched off. Therefore, the monitoring device 32 generates a control command S, by which, for example, contactors, via which the high-voltage battery is connected to a DC link of the high-voltage system 12, are opened.

To detect the collision, the monitoring device 32 compares the received signals with respective predefined target gradients of these signals or a template of, for example, time-dependent maximum values and minimum values, which may not exceed or fall below the signal. Threshold values may also be used. The markings 22, a road surface 52, on which the wheel 38 rolls, the third party vehicle 24, the object 26, and the satellite 50 represent hereby reference objects, based on which the monitoring device 32 detects via the received signals a self-movement of the motor vehicle 10 and recognizes therefrom a rolling or an impact upon the motor vehicle 10.

Thus, the invention generally enables in a motor vehicle 10 a detection of a collision or a crash, when charging an electric/plug-in hybrid vehicle during wireless charging. As a result, the high-voltage system can be rapidly switched off in the event of a crash at standstill, in particular also in ignition-off state of the motor vehicle.

The detection of the movement of the vehicle as a result of a crash is implemented preferably by using a movement of the motor vehicle based on a functionality for positioning of the motor vehicle via the inductive charging plate with the primary coil 18. As an alternative, it is also possible to use a further existing system of the motor vehicle 10, which system is enabled even when ignition is off or can easily be switched on, like, for example, a driver assist system 34 or a GPS positioning system 48 for generating GPS data G. In this way, a movement of the motor vehicle may also be detected, so long as the movement is of sufficient magnitude. This recognition can, of course, also be used additionally when ignition is on, i.e. redundant to the control unit for the crash detection.

Of advantage is hereby the use of already existing functions to detect a crash event when ignition is off and, consequently, an enhancement of the safety. Also, this functionality can be used as a redundant system with ignition on, when at a standstill or during charging.

The detection of a movement by the positioning sensor 20 of the contactless charging system can also be combined with, for example, the evaluation of a GPS signal, which also indicates this movement from one position to another one, when the vehicle has moved sufficiently.

To avoid false activation, the vehicle should be in charge mode as input condition for the crash detection. When the charger plug is inserted, guidelines and legislation dictate i.a. that the vehicle may not move or it may not be possible to re-establish a running condition. Normally, the brake is engaged accordingly. In the presence of one of these input conditions or a combination of these conditions, it is possible to correctly and reliably recognize the situation, so that there is no false diagnosis in other operating states.

Even in the absence of a charging, the described collision and/or movement detection according to the invention may be useful, when, e.g., a high-voltage system is enabled because of auxiliary air conditioning. Provision may also be made for other vehicle functions in which the high-voltage system are enabled without ignition of the motor vehicle being switched on and in the absence of a person in the vehicle or in the vicinity of the motor vehicle.

The invention claimed is:

1. A method for detecting whether a motor vehicle in a parked state and in a switched-off state has been hit or moved, said method comprising the steps of:
    transmitting at least one sensor signal as a function of a position of the motor vehicle relative to at least one vehicle-external reference object from a sensor to a monitoring device in communication with a control unit for controlling the action of the monitoring device;
    comparing the at least one sensor signal with at least one predetermined signal pattern or with at least one predetermined value interval or with at least one predetermined signal template;
    transmitting at least one control command initiating a safety measure to at least one unit of the motor vehicle, when the comparing step reveals a difference;
    generating an impedance value signal as the sensor signal in an inductive charging system, the inductive charging system including a primary coil and a secondary coil and a charging device of a traction battery of the motor vehicle, wherein the impedance value signal changes when a position of the secondary coil relative to the primary coil changes;
    detecting a collision on the basis of the at least one predetermined signal pattern or the at least one predetermined value interval or the at least one predetermined signal template, which includes a predetermined momentum or a predetermined acceleration or a predetermined displacement path of the motor vehicle or a predetermined timing course; and deploying an airbag in an event of a collision.

2. The method of claim 1, wherein the at least one unit of the motor vehicle is a high-voltage system or a charger of the traction battery of the motor vehicle, said transmission of the at least one control command causing a switch-off of the high-voltage system or the charger as the safety measure.

3. The method of claim 1, further comprising transmitting the sensor signal also to at least one further component of the motor vehicle to cause execution in the motor vehicle of a function which is different from a detection of a collision.

4. The method of claim 1, wherein the sensor is a positioning sensor system of an inductive charging system to generate a positioning signal as the sensor signal.

5. The method of claim 1, wherein a GNSS signal is generated as the sensor signal.

6. The method of claim 1, wherein the sensor is a navigation assist system to generate a movement signal as the sensor signal.

7. The method of claim 1, wherein the sensor signal is a distance signal of an ultrasonic sensor, or a radar sensor, or an image signal of a camera.

8. The method of claim 1, wherein the at least one control command is generated only when at least one of the following plausibility conditions is met:
  a charging mode is enabled for charging the traction battery of the motor vehicle,
  a charging plug is inserted,
  a parking brake of the motor vehicle is engaged,
  an ignition of the motor vehicle is switched off,
  a high-voltage component is enabled, when the ignition is off.

9. The method of claim 1, wherein after starting of the motor vehicle, a current position value of the motor vehicle is compared with a position value which has been stored ahead or during a preceding shutdown of the motor vehicle, and upon detection of a difference between the two position values the at least one control command is generated.

10. A motor vehicle, comprising:
  a sensor configured to generate at a standstill of the motor vehicle a sensor signal which is dependent on a relative position of the motor vehicle with respect to at least one vehicle-external reference object, said sensor being impedance measuring sensors in an inductive charging system generating an impedance value signal as the sensor signal;
  a monitoring device in communication with a control unit for controlling the action of the monitoring device configured to receive the sensor signal and to compare the at least one sensor signal with at least one predetermined signal pattern or with at least one predetermined value interval or with at least one predetermined signal template, said monitoring device transmitting at least one control command initiating a safety measure to at least one unit of the motor vehicle, when the comparison reveals a difference; and
  an inductive charging system including a primary coil and a secondary coil and a charging device of a traction battery of the motor vehicle, said sensor forming part of the inductive charging system and configured as a positioning device to transmit a positioning signal to the monitoring device, wherein the impedance value signal changes when a position of the secondary coil relative to the primary coil changes;
  wherein on the basis of the at least one predetermined signal pattern or the at least one predetermined value interval or the at least one predetermined signal template, a collision is detected, which includes a predetermined momentum or a predetermined acceleration or a predetermined displacement path of the motor vehicle or a predetermined timing course, and an airbag is deployed.

11. The motor vehicle of claim 10, wherein the at least one unit of the motor vehicle is a high-voltage system or a charger for the traction battery of the motor vehicle, said monitoring device causing a switch-off of the high-voltage system or the charger as the safety measure.

12. The motor vehicle of claim 10, wherein the sensor transmits the sensor signal to at least one further component of the motor vehicle to cause execution in the motor vehicle of a function which is different from a detection of a collision.

13. The motor vehicle of claim 10, wherein a GNSS signal is generated as the sensor signal.

14. The motor vehicle of claim 10, wherein the sensor is a navigation assist system to generate a movement signal as the sensor signal.

15. The motor vehicle of claim 10, wherein the monitoring device is configured to generate the at least one control command only when at least one of the following plausibility conditions is met:
  a charging mode is enabled for charging a traction battery of the motor vehicle,
  a charging plug is inserted,
  a parking brake of the motor vehicle is engaged,
  an ignition of the motor vehicle is switched off,
  a high-voltage component is enabled, when the ignition is off.

* * * * *